United States Patent [19]
Hughes

[11] 3,903,875
[45] Sept. 9, 1975

[54] AUTOMATICALLY CALIBRATED RESPIRATORY VENTILATION MONITOR

[75] Inventor: Philip A. Hughes, Littleton, Colo.

[73] Assignee: Sandoz Inc., E. Hanover, N.J.

[22] Filed: Jan. 24, 1974

[21] Appl. No.: 436,128

[52] U.S. Cl........ 128/2.08; 73/194 R; 128/DIG. 29; 330/85
[51] Int. Cl.²......................................... A61B 5/08
[58] Field of Search ............ 128/2.08, 2 S, DIG. 29, 128/2.06 B, 2.05 F; 73/194 R; 330/85, 110, 9

[56] References Cited
UNITED STATES PATENTS

| 3,237,116 | 2/1966 | Skinner et al. | 330/85 X |
| 3,577,984 | 5/1971 | Levy et al. | 128/2.08 |
| 3,726,271 | 4/1973 | Mondshine et al. | 128/2.08 |
| 3,765,239 | 10/1973 | Olsson | 73/194 R |

FOREIGN PATENTS OR APPLICATIONS

| 1,508,303 | 11/1967 | France | 128/2.08 |

Primary Examiner—Kyle L. Howell
Attorney, Agent, or Firm—Gerald D. Sharkin; Robert S. Honor; Walter F. Jewell

[57] ABSTRACT

A respiratory ventilation monitor having a flow sensing transducer including a thermistor connected in a bridge circuit for providing a signal indicative of air flow across the thermistor. The output of the bridge circuit is connected to a differential amplifier for controlling a current source to maintain the bridge in a balanced condition. Changes in current supplied to the bridge circuit are detected and applied to a second differential amplifier having an exhalation signal output corresponding in time and magnitude with the quantity of air being exhaled by a patient being monitored. An automatic calibration system is provided to control the zero level of the exhalation signal and such system includes a feedback circuit connected between the signal output and input terminals of the differential amplifier so that manual calibration is unecessary for overcoming small variations in ambient conditions.

2 Claims, 2 Drawing Figures 3,903,875

AUTOMATICALLY CALIBRATED RESPIRATORY VENTILATION MONITOR

BACKGROUND OF THE DISCLOSURE

This invention pertains to a respiratory ventilation monitor, and particularly to such a monitor having an automatic calibration circuit for automatically establishing the zero level of the output signal generated by the device. Accordingly, this invention precludes the necessity of using a manually operable calibration circuit as required in the prior art.

SUMMARY OF THE INVENTION

In accordance with the invention there is provided apparatus for measuring the breathing characteristics of a patient, wherein the air exhaled by the patient is measured by transducing circuitry which generates an electrical output signal corresponding to the breathing characteristics. The apparatus includes circuitry for recalibrating the zero level of the measuring circuitry during the inhalation segment of each breath cycle.

In one embodiment of the invention, the transducer portion of the apparatus includes a thermistor connected in a bridge circuit, wherein the thermistor is mounted in an exhalation hose connected to a patient so that the bridge circuit output varies with the flow of air exhaled by the patient. The output of the bridge circuit is applied through a feedback path including a current source in order to maintain the bridge in a balanced state, and the variations in current supplied to the bridge are monitored and used as electrical output signals from the transducing portion of the circuitry. The transducer output is applied as one input to a differential amplifier, whose output is in turn applied to an amplifier which provides output signals corresponding in amplitude and time to the exhalation characteristics of a patient's breathing cycle, and which provides a zero signal level in between such exhalation periods. The output of the amplifier is applied to a Schmidt trigger circuit having an output which in turn is utilized to control a feedback path from the output of the amplifier to the second input of the differential amplifier, so that the zero level of the amplifier output is automatically calibrated. Specifically, in one embodiment the Schmidt trigger controls the gate electrodes of a pair of FET switches, the first of which couples the output of the amplifier to an inverting amplifier, and then through the other FET switch to a sample and hold circuit connected to the input of an FET source follower, which in turn has its output connected to the said second input of the differential amplifier. The signal polarities are arranged so that during the exhalation period, the Schmidt trigger biases the two FET switches into an "off" condition so that the output of the amplifier is controlled by the transducer output during the exhalation period; and, between the end of one exhalation period, and the beginning of the next, the Schmidt trigger biases the two FET switches into an "on" condition so that the feedback path is completed to recalibrate the differential amplifier and amplifier combination to a zero level at all times except during the exhalation period.

BRIEF DESCRIPTION OF THE DRAWING

The accompanying drawings are for use in conjunction with the detailed description of a preferred embodiment of the invention which follows. In such drawings.

DETAILED DESCRIPTION OF A PREFERRED EMBODIMENT

Figure 1:
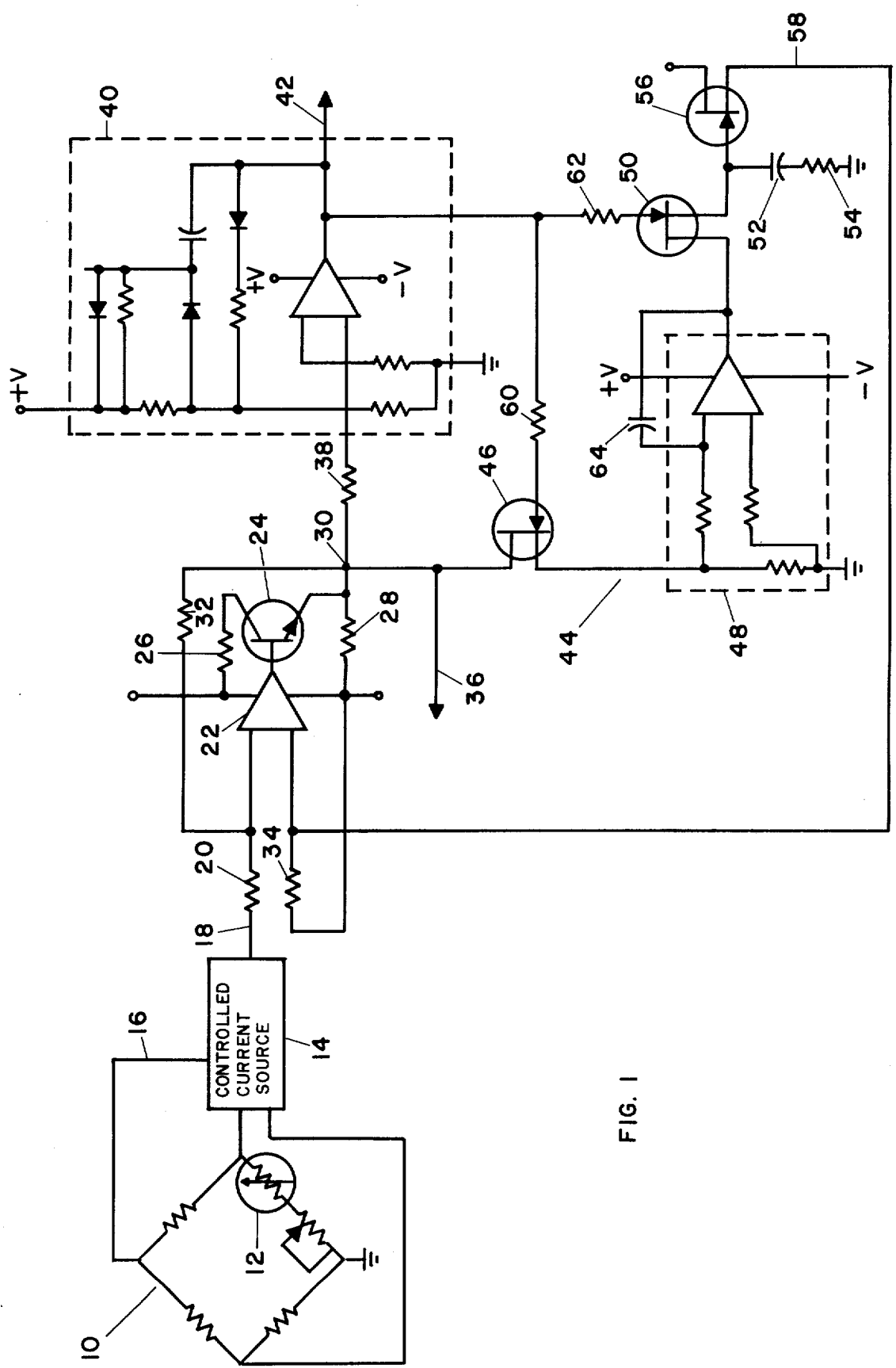
FIG. 1 is a schematic diagram of the transducer and zero level calibration portion of a respiratory ventilation monitor according to the invention.

As illustrated in the drawings, the transducer portion of a respiratory ventilation monitor may comprise a resistance bridge 10 having a thermistor 12 coupled in one leg thereof, wherein the output of the bridge is applied to a controlled current source 14 having an output 16 for supplying a balancing current to the transducer bridge 10. Variations in the controlled current output from the source 14 are detected and supplied at a second output 18 for coupling through a resistor 20 to the negative input of a differential amplifer 22. The differential amplifier is connected to positive and negative voltage sources, which in turn are connected to an emitter follower amplifier comprising an NPN transistor 24 having respective collector and emitter resistors 26 and 28 connected to said voltage sources. The base electrode of the transistor 24 is connected to the output of the differential amplifier 22, and the output 30 of the emitter follower amplifier is taken at the junction between the emitter and the resistor 28. The output 30 is also coupled back to the negative input of the differential amplifier 22 through a resistor 32, and the positive input to the differential amplifier 22 is coupled through a bias resistor 34 to the negative voltage source. Representative wave forms which exist at the negative input to the differential amplifier 22 and at the output 30 from the transistor 24 are shown at curves A and B of FIG. 2, wherein it is illustrated that the output 18 from the controlled current source 14 provides a positive signal during the exhalation portion of the patient's breathing cycle, while the signal at the output 30 from the transistor 24 provides a negative signal during that corresponding exhalation period. Then, both of those signals remain at their zero level from the end of one exhalation period to the beginning of the next such period. Therefore, in order to ensure that the transducer circuit produces an output only during the exhalation cycle, it can be seen that the thermistor 12 must be connected downstream of an exhalation valve in the respiratory apparatus.

In the practice, the output signal at the circuit point 30 may be coupled through a conductor 36 for processing by other portions of the monitor apparatus to produce desired output indications of the patient's breathing characteristics. Furthermore, the signal at the output point 30 is also coupled through a resistor 38 and a Schmidt trigger circuit 40 for processing by such other portions of the monitor apparatus which receive the output signal along conductor 42.

Figure 2:
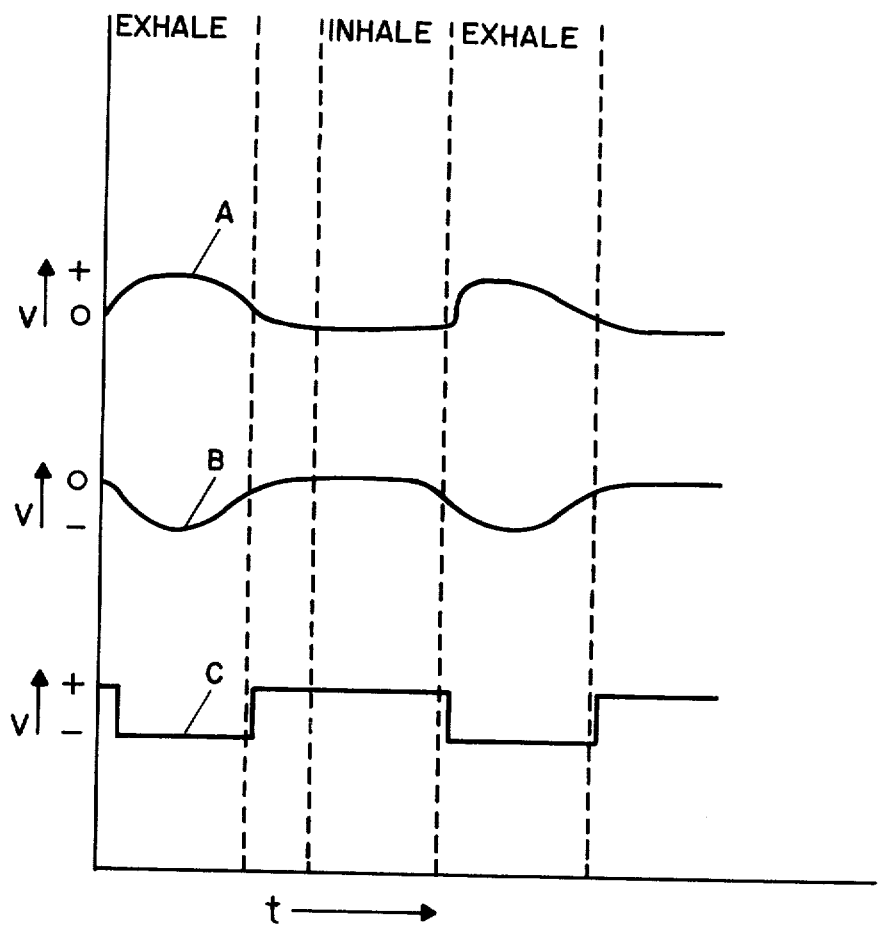
FIG. 2 is a chart showing various signal levels which occur in the circuitry of FIG. 1.

The output of the Schmidt trigger circuit 40, as illustrated in curve C of FIG. 2, switches from a positive output to a negative output for the duration of the exhalation period, and then switches back to a positive value at the end of the exhalation period.

In order to prevent the zero level of the signal at output 30 from drifting due to minor changes in ambient conditions, and to preclude the necessity of a manual calibration means for overcoming such drift, there is provided an automatic zero level calibration circuit 44 connected in a feedback path between the output 30 and the positive input to the differential amplifier 22. The calibration circuit 44 includes an input gate defined by an FET switch 46 through which the signal from the output point 30 is coupled to an inverter circuit 48. The output from the inverter circuit is applied through an output gate defined by a second FET switch 50 to a sample and hold circuit comprising the series combination of a capacitor 52 and a resistor 54 connected to ground. The capacitor 52 of the sample and hold circuit is also connected to an FET source follower device 56 having its drain electrode connected to a point of positive potential, and its source electrode connected through an output conductor 58 of the calibration circuit 44 to the positive input of the differential amplifier 22. As illustrated, the gate transistors 46 and 50 are connected through resistors 60 and 62, respectively, to the output of the Schmidt trigger 40, whereby the FET transistors 46 and 50 are switched "on" by positive outputs from the Schmidt trigger, and are switched "off" by negative signals from the Schmidt trigger which occur during the exhalation period of a patient's breathing cycle.

In the operation of the monitor apparatus illustrated in FIG. 1, as can be observed from the curves of FIG. 2, a positive going signal is applied from the controlled current source 14 to the negative input of the differential amplifier 22 during the exhalation portion of a patient's breathing cycle; and the signal at the output point 30 from the amplifier transistor 24 during such exhalation period comprises a negative-going signal which is then applied to the Schmidt trigger. The output of the Schmidt trigger 40 also switches negatively during the exhalation period so that both of the FET switches 46 and 50 are switched to their non-conductive states. Accordingly, during the exhalation period the negative Schmidt trigger output is coupled along conductor 42 to other signal processing circuitry (not shown), while the signal at the output point 30 from the amplifier transistor 24 is coupled along conductors 36 to additional processing circuitry (not shown). Then, at the trailing end of the exhalation cycle, the signal at output point 30 changes in the positive direction in response to the decreasing exhalation signal at the input to the differential amplifier 22, and when said signal at the output point 30 crosses the threshold level of the Schmidt trigger, the output of the Schmidt trigger switches to a positive voltage, whereupon the FET switches 46 and 50 are brought into their conductive states. At this juncture, the positive signal at the output point 30 is coupled through the switching transistor 46, the inverting amplifier 48, and the switching transistor 50 to the sample and hold circuit (52, 54), and through the FET source follower 56 to the positive input of the differential amplifier 22. Accordingly, at all times, excepting the exhalation portion of the breathing cycle, the output signal at the point 30 is automatically calibrated to a zero level.

As shown in FIG. 1, a feedback capacitor 64 is coupled between the output of the inverting amplifier 48 and an input signal terminal thereof for the purpose of imparting a slight delay to the feedback signal, so that the feedback circuit will not produce a cumulative effect on the negative going signal at the output point 30 upon commencement of a subsequent exhalation signal. That is, when a subsequent exhalation cycle begins, the output signal at the point 30 begins to decrease, and the delaying capacitance 64 prevents that signal from decreasing disproportionately due to operation of the feedback circuit 44, thus enabling the Schmidt trigger to switch negatively and cut off the FET transistors 46 and 50 before the feedback signal through the circuit 44 is applied to the output signal at the point 30.

What is claimed is:

1. An improved respiration ventilation monitor comprising transducer means for generating an output signal in response to the exhalation of air by a patient during successive breathing cycles, wherein said transducer means comprises a resistance bridge circuit having a thermistor connected therein for mounting in a passage receiving air exhaled by the patient, controlled current source means having inputs coupled to the output of said bridge circuit, and having a first output coupled to said bridge circuit to balance the current applied to said thermistor, said controlled current source means including a second output for producing a signal proportional to said balancing current, amplifier means for producing an exhalation signal comprising a differential amplifier having first and second inputs, wherein said second output of said controlled current source means is coupled to said first input of said differential amplifier, and wherein said amplifier means further comprises an emitter follower output amplifier connected to the output of said differential amplifier, means for automatically calibrating a zero level of said exhalation signal, said calibrating means including a feedback circuit coupled from the output of said emitter follower amplifier to the second input of said differential amplifier, and further comprising a Schmidt trigger circuit having an output, and having an input connected to the output of said emitter follower amplifier, wherein said feedback circuit includes an inverting amplifier, an input gate circuit coupled between said output of said emitter follower amplifier and an input of said inverting amplifier, sample and hold circuit means having an output coupled to said second input of said differential amplifier, an output gate circuit coupled between the output of said inverting amplifier and an input to said sample and hold circuit means, means connecting said input and output gates to the output of said Schmidt trigger circuit, wherein said input and output gate circuits are energized by said Schmidt trigger output to actuate said feedback circuit of said calibrating means during all portions of said breathing cycles except said exhalation portions.

2. An improved respiration ventilation monitor comprising transducer means for generating an electrical output signal in response to the exhalation of air by a patient during successive breathing cycles, differential amplifier means having first and second inputs and having its said first input coupled to the output of said transducer means for producing a signal which is proportional as a function of time to the quantity of air exhaled by the patient, and means for automatically calibrating a zero level of the exhalation signal from the amplifier means; said calibrating means including Schmidt trigger circuit means having an output, and having an input coupled to the output of said differential amplifier for producing an output signal during the generation of said electrical output signal from said transducer means, an inverting amplifier, an input gate circuit coupled between said output of said amplifier means and an input of said inverting amplifier, sample and hold circuit means having an input, and having an output coupled to said second input of said differential amplifier means, an output gate circuit coupled between the output of said inverting amplifier and said input to said sample and hold circuit means, means connecting said input and output gates to the output of said Schmidt trigger means, wherein said input and output gate circuits are actuated by said Schmidt trigger means output signal to couple said inverting amplifier and sample and hold circuit means in a feedback path between said output and said second input to said differential amplifier means for maintaining said amplifier means output at a zero level during all portions of said breathing cycles except said exhalation portions.

* * * * *